UNITED STATES PATENT OFFICE.

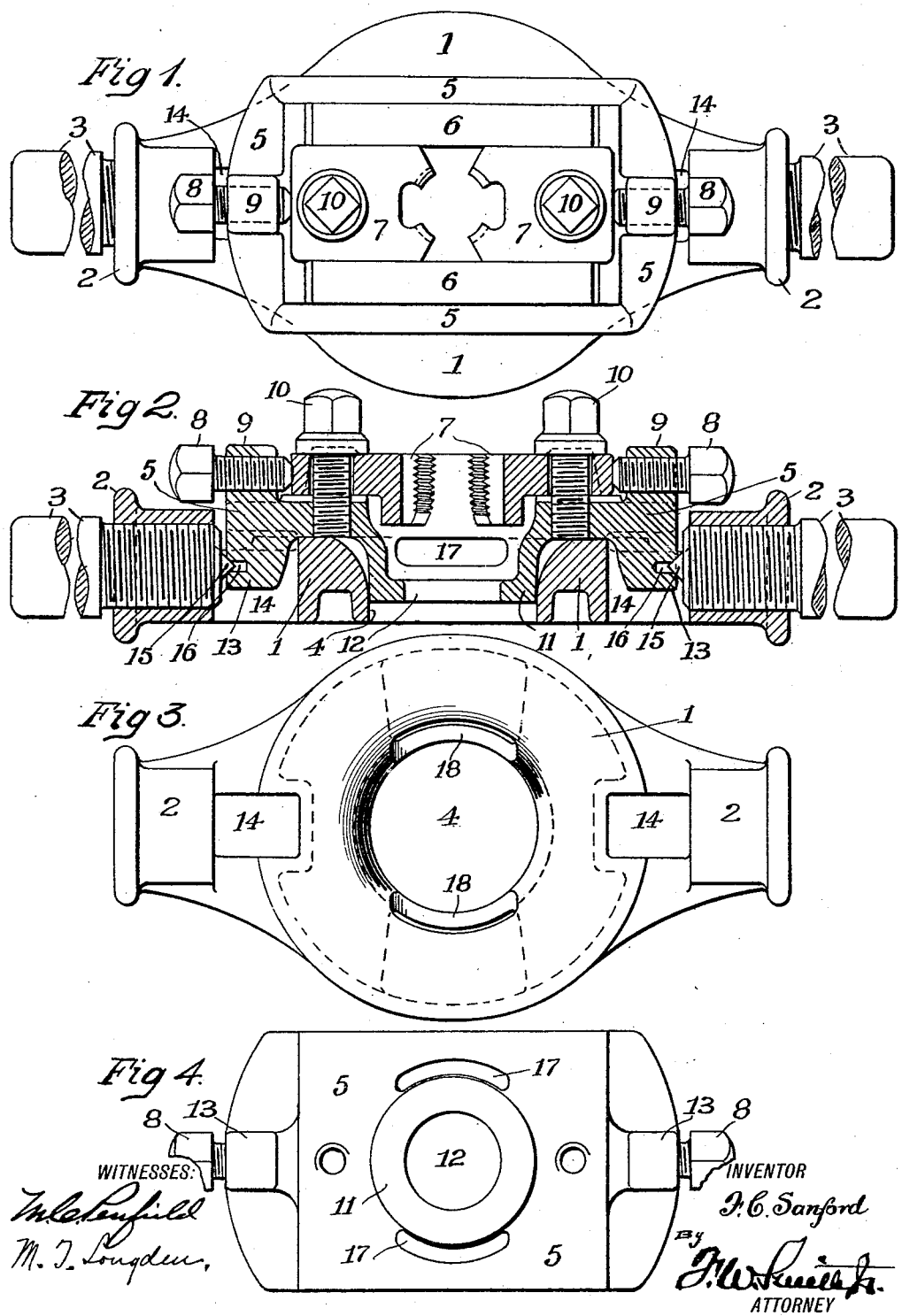

FRANK C. SANFORD, OF BRIDGEPORT, CONNECTICUT, ASSIGNOR TO THE ARMSTRONG MANUFACTURING COMPANY, OF BRIDGEPORT, CONNECTICUT, A CORPORATION OF CONNECTICUT.

DIE-STOCK.

1,119,765.      Specification of Letters Patent.      Patented Dec. 1, 1914.

Application filed August 12, 1914. Serial No. 856,434.

*To all whom it may concern:*

Be it known that I, FRANK C. SANFORD, a citizen of the United States, residing at the city of Bridgeport, county of Fairfield, State of Connecticut, have invented certain new and useful Improvements in Die-Stocks; and I do declare the following to be a full, clear, and exact description of the invention, such as will enable others skilled in the art to which it appertains to make and use the same.

My invention relates to die stocks, and has for its object to provide a very simple and efficient tool of this description, with particular reference to convenience in assembly for the purpose of equipping the die stock in order to cut threads on different sizes of pipes, bolts, &c.

In the drawings Figure 1 is a plan view of the completely assembled die stock with the handles broken away—Fig. 2 a central longitudinal section of the same—Fig. 3 a detail plan view of the die stock body with the die carrier and dies removed, and Fig. 4 is a bottom view of the die carrier.

Similar numerals of reference denote like parts in the several figures of the drawing.

Heretofore it has been customary, after cutting threads, to remove the dies and place them in any suitable receptacle provided so that the die stock may be equipped with other dies for the cutting of threads on another size of pipe, and frequently these cutting dies have been carelessly thrown in a box or other receptacle without regard to size. It has therefore been necessary for the operator to pick out the proper threading dies and then to place them within the die stock, and this is a matter that has proved quite annoying, frequently necessitating quite a search in order to find the proper dies.

My present improvement contemplates a die carrier for each size of pipe with the dies always secured therein, and as these die carriers are marked with numbers denoting the proper size, it is a very simple matter to pick out the proper die carrier and secure it within the die stock, and there can be no confusion as to the threading dies. Each die stock has a bushing through which the pipe to be threaded is passed, and this bushing will conform closely to the proper size of pipe and no other, so that if, by mistake, a workman picks up a die carrier which he supposes is equipped with dies for cutting threads on a three-quarter inch pipe, when, as a matter of fact, such carrier is equipped with dies for cutting threads on an inch pipe, he quickly discovers his mistake when he inserts the pipe through the bushing in the die carrier.

The above advantages of my improvement, as well as other good features, will be apparent from the following description.

1 is the body of the die stock provided with the usual threaded sockets 2 for the operating handles 3.

4 is an open housing in the die stock body whose purpose will be hereinafter fully explained.

5 is the die carrier having ways 6 within which the dies 7 are placed, these dies being backed up by screw bolts 8, driven through ears 9 rising from the ends of the carrier 5, against the heel ends of the dies.

10 are screw bolts driven through the dies from top to bottom into the body of the die carrier so as to clamp the dies firmly in position.

11 is a bushing which extends rearwardly from the die carrier within the housing 4 of the die stock body, and this bushing has an opening 12 through which the pipe to be threaded is inserted, this opening being of such size as to conform snugly to the pipe itself, so as to steady the die stock on the pipe during the thread cutting operation.

The die carrier is provided with lugs 13 which project within openings 14 formed in the body of the die stock so that when the parts are assembled the engagement of these lugs 13 and openings 14 will insure a firm union between the die carrier and the die stock body, and the extreme inner ends of the handles 3 are provided with cone shaped projections 15 which are driven within sockets 16 in the outer faces of the lugs 13, so as to firmly lock the die carrier and the die stock body together. The bushing 11, fitting, as it does, snugly within the housing 4 still further contributes toward the firm union between the die carrier and the die stock body, and this bushing also acts as a chip shedder and is provided with discharge openings 17 which register with corresponding openings 18 in the die stock body. When the device is operated the chips will be shed by the bushing 11 out through the openings 17, 18.

To remove a die carrier with its dies it is merely necessary to back the handles 3 a trifle until the cones 15 disengage from the sockets 16, whereupon the die carriers may be lifted out of the die stock and other carriers substituted therefor.

Having thus described my invention what I claim as new and desire to secure by Letters Patent is:—

1. A die stock comprising a die stock body having suitable operating handles, a die carrier having secured therein suitable threading dies, means for detachably securing said die holder and die stock body together, a housing formed in the die stock body, and a bushing projecting from the rear of the die carrier within said housing and provided with an opening closely conforming to the size of the pipe to be threaded.

2. A die stock, comprising a body portion having a central socket and provided with diametrically opposite openings extending from front to rear, threaded operating handles for said body provided at their inner ends with cone projections, a die carrier having secured therein the threading dies and provided with rearwardly extending lugs which project within the openings in the stock body and are provided in their outer faces with sockets which are engaged by said cone projections whereby the die carrier is detachably secured to the die stock body.

3. A die stock, comprising a body portion having a centrally disposed housing flanked by openings from face to rear and provided with threaded operating handles that have cone projections at their inner ends, and a die carrier having dies secured therein and having lugs which extend within said openings and provided in their outer faces with small sockets with which said cone projections engage to detachably secure said carrier to said body portion.

In testimony whereof I affix my signature in presence of two witnesses.

FRANK C. SANFORD.

Witnesses:
F. W. SMITH, Jr.,
M. T. LONGDEN.

Copies of this patent may be obtained for five cents each, by addressing the "Commissioner of Patents, Washington, D. C."